Patented June 11, 1940

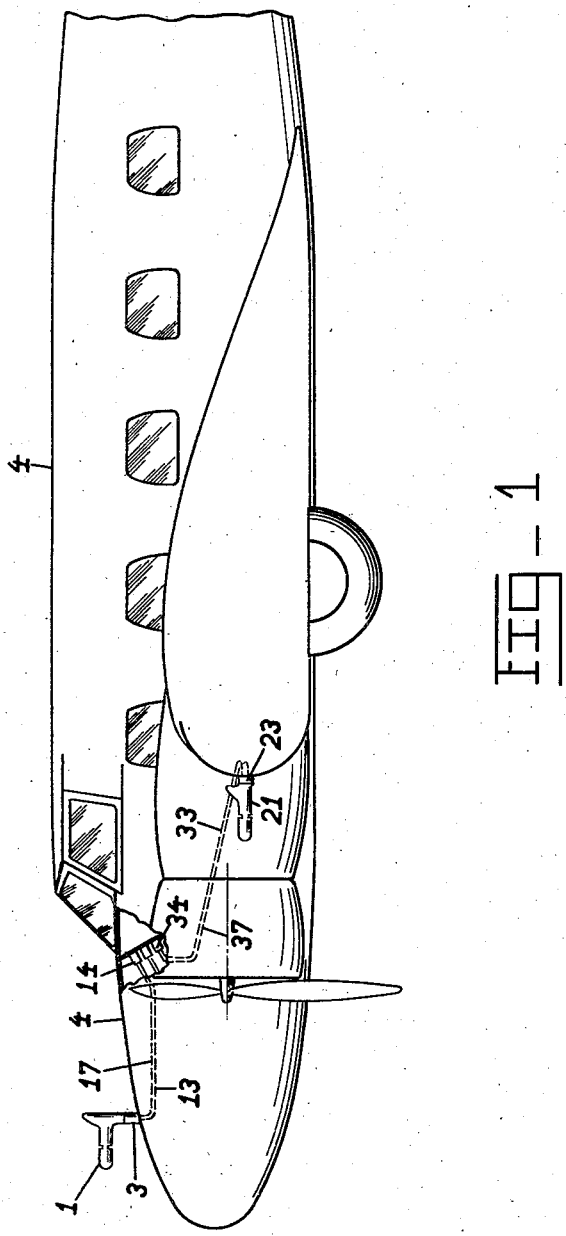

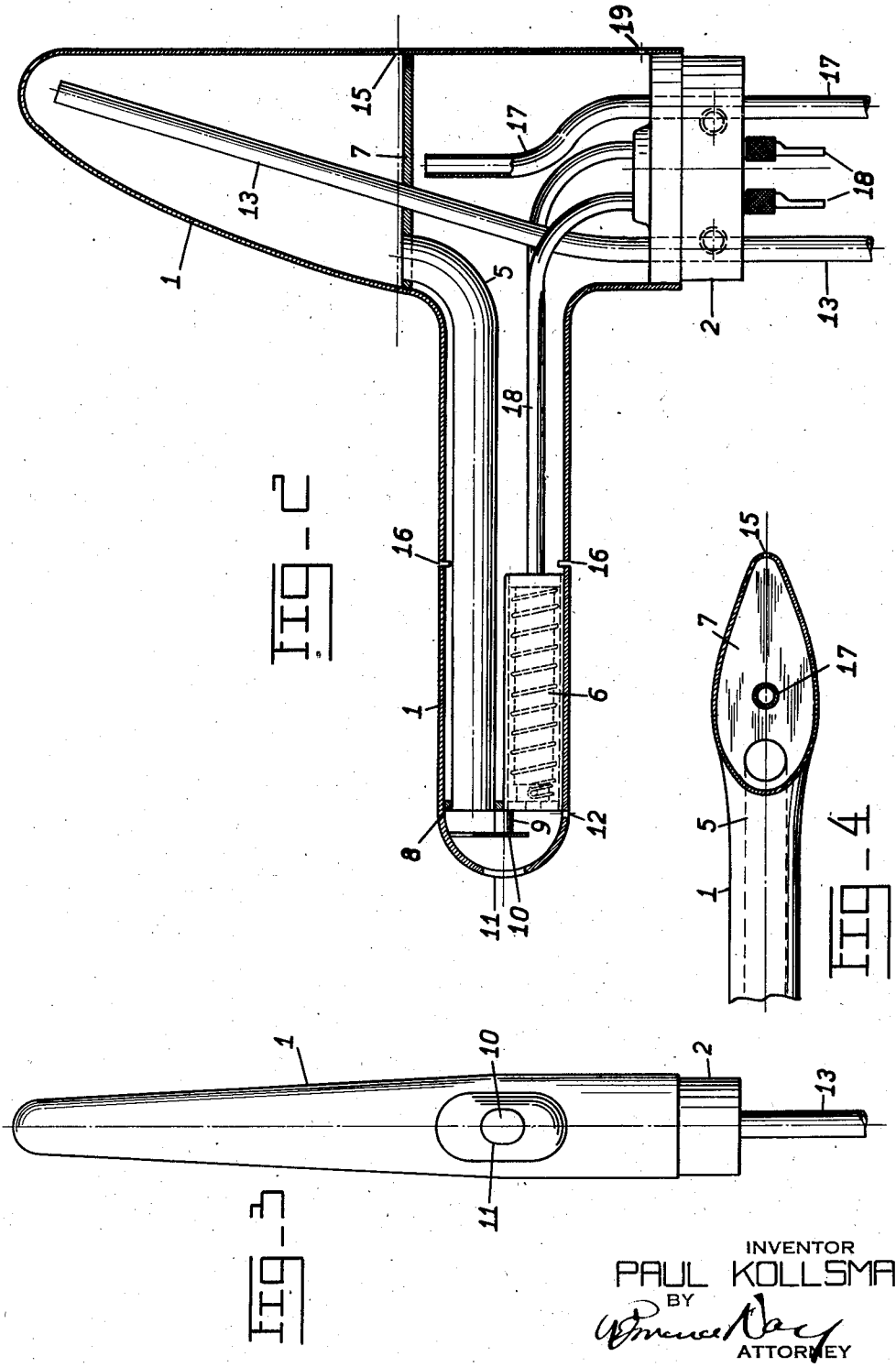

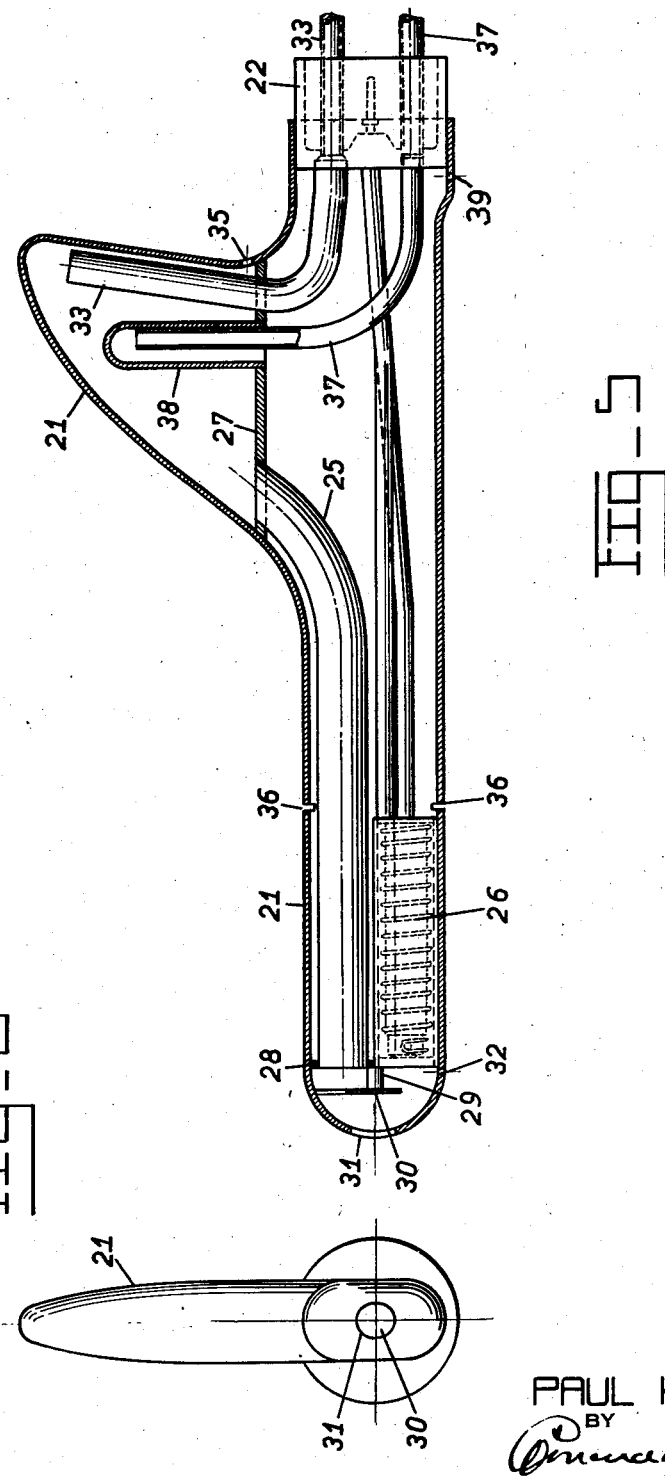

2,204,367

UNITED STATES PATENT OFFICE 2,204,367

TRAPPED SELF-DRAINING PITOT-STATIC TUBE

Paul Kollsman, New York, N. Y., assignor, by mesne assignments, to Square D Company, Detroit, Mich., a corporation of Michigan Application May 3, 1938, Serial No. 205,765

8 Claims. (Cl. 73—212)

This invention relates to airplane speed responsive instruments of the Pitot-static tube type, and relates particularly to a Pitot-static tube having means for separating moisture and water from the air in the tube and means for the trapping out of water away from the instrument line.

In the prior art of the construction of Pitot-static tubes difficulty has been encountered, particularly with tubes mounted on seaplanes, from the entry of spray or other aqueous material or water forms into the Pitot-tube which tends to block the tube and disable the connected instruments by the presence of plugs of water in the connecting lines which by their weight and the capillary attraction at the surfaces, produce false pressures upon the indicating instruments; and difficulty is particularly met in instances when freezing temperatures are encountered which tend to solidify any water present in the various portions of the system producing solid plugs which also tend to interfere with the development of correct pressures and with the operation of connected instruments.

It has been customary with prior Pitot-static tubes to provide a streamlined shell having therein a "Pitot" tube or dynamic pressure member opening at the forward tip of the shell, and slots or perforations in the side of the shell to provide a static pressure value within the shell. Both the Pitot tube and the static shell interior are connected by tubular duct lines to a pressure sensitive instrument which responds to the pressure differential between the Pitot pressure line and the static pressure line, and indicate the pressure in terms such as air speed or accomplishes other functions.

Previously constructed Pitot-static tubes have, however, suffered from the disadvantage that under bad atmospheric conditions or in the presence of spray it has not always been possible to keep the Pitot-static tube free from clogging and in operating order. During clear, good, flying weather the readings of the air speed indicator are of interest, but not vital to the navigation of the plane. However, in bad flying weather when the pilot is flying "on instruments," and under the necessity of estimating the distance flown by a "dead reckoning" computed from the indicated air speed and elapsed time, it is of importance that his air speed indicator or similar instruments be wholly reliable, but it is under bad atmospheric conditions that the air speed indicator and Pitot tube combination is most likely to fail. Such failure is usually due to obstruction of the Pitot tube or of the static shell by frost, ice or water from the spray, or from the fog, rain or snow through which the pilot may at the moment be flying.

In my copending applications, Serial No. 135,858 filed April 9, 1937, and Serial No. 195,465 filed March 12, 1938, there is disclosed a Pitot-static tube construction in which there is incorporated a controlled heater member adapted to provide sufficient heat to prevent obstruction of the tubes by ice or snow which may tend to accumulate thereon, or therein.

The present invention provides a Pitot-static tube (adapted if desired to be mounted in a socket attached to a plane member high in the plane structure), in which there is incorporated a baffle means for precipitating water particles and means for trapping out in a trapping chamber any fluid or water which might otherwise accumulate and means for draining it from the trapping chamber, thereby preventing passage of the water into the tube lines leading to the instrument. This trapping drainage of the fluid from the device prevents waterlock in the lines any any resulting pressure abnormalities in the lines leading from the Pitot-static tube to the instrument, and any consequent false readings of the indicator; and permits placing it even within a spray zone and above the responsive instrument.

Thus, an object of the invention is to drain water from a Pitot-static tube before it passes therethrough far enough to cause pressure irregularities.

Another object of the invention is to trap water from the lines of a Pitot-static air speed indicator.

Still another object of the invention is to prevent the deposition of water and ice in a Pitot-static tube and to drain and trap the water therefrom at a point near enough the entrance of the tubes to prevent pressure irregularities and false indications.

A further object of the invention is to provide a Pitot-static tube which may be mounted above the level of the indicating instrument without causing water to flow from the tube to the indicating instrument.

Still another object of the invention is to streamline a Pitot-static tube device and to incorporate therein a streamlined fluid trap.

Other objects and structural details of the invention will be apparent from the following description when read in connection with the accompanying drawings wherein:

Fig. 1 is a side view, partly in section, of an airplane and Pitot-static tubes and indicators mounted thereon.

Fig. 2 is a side view, in section, of a Pitot-static tube having a heater and fluid traps incorporated therein.

Fig. 3 is a front view, in elevation, of the embodiment of Fig. 2.

Fig. 4 is a top view, partly in section, of the embodiment of Figs. 2 and 3.

Fig. 5 is a side view in section of an alternative embodiment adapted to a different type of mounting, and Fig. 6 is a front view of the embodiment of Fig. 5.

Referring to the figures, a desirable form of the invention which is particularly adapted to the mounting of the Pitot tube upon the upper surface of the airplane structure is shown in Figs. 1, 2, 3 and 4. In these figures the Pitot-static shell member 1 is attached to a supporting block or socket 2 as shown in Figs. 2 and 3. The block or socket 2 is adapted to enter a streamlined tube member for support of the Pitot-static tube a substantial distance away from, or above, the member of the airplane which carries the tube; or as shown in Fig. 1 the member 2 may cooperate with the member 3 which in turn is attached to the fuselage 4 of the airplane. The shell member 1 may desirably consist of a forward portion preferably of substantially elliptical cross-section, surrounding the Pitot tube 5 and a heater member 6; and in addition a water trap portion at the top, which is separated from the rest of the shell 1 by a partition 7. The water trap portion may assume the form of a shark's fin, as shown in the drawings, and form an upward extension of the supporting portion including the socket 2. The Pitot tube, or dynamic duct 5, which is terminated rearwardly at the partition 7 is terminated forwardly at a partition 8 in the shell member 1. Attached to the front surface of the partition 8 is a boss 9 upon which there is mounted a baffle member 10, facing the dynamic duct opening 11. At the bottom of the chamber formed in the forward portion of the shell 1 by the partition 8 there is provided a small drain opening 12 through which any water precipitated from entering air by the baffle member 10 is allowed to drain.

As shown in Fig. 1 the Pitot tube member 5 extends from the front end of the shell member 1 to the trap portion, through the partition 7. There is also provided an instrument line or tube 13 which passes through the partition 7 and upward to a point adjacent the top of the trap portion of the shell 1. The tube 13 is extended through the support member 2 and thence to the instrument 14, which may be an indicating instrument of the aneroid capsule type, on the instrument board of the plane or may be any other desired instrument of appropriate type.

Thus any water which is driven into the opening 11 impinges upon the baffle 10 and is mostly precipitated out upon the baffle and drips downward to the bottom of the chamber forward of the partition 8 and drains outward through the opening 12. Any residual water, spray or moisture which is not thrown out by the baffle 10 may enter the tube 5, precipitate therein and may be carried backward until the end of the tube 5 is reached, whereafter the water falls to the floor of the trap onto the partition 7 from which it may drain out through the tube 5 in some positions of the plane, or through the drain opening 15 at the back of the shell 1.

Static pressure slots 16 are also provided in the shell 1 rearwardly of the partition 8, and preferably rearwardly of the heater; and a static pressure line 17 is provided leading from the main portion or static pressure chamber of the shell 1 (into which the slots 16 open) through the support member 2 to the instrument 14. A drainport 19 may be provided in the static portion or chamber of the shell.

Heating current supply to the heater 6 passes through the lead wires 18 which are connected to suitable connector members as shown.

In the operation of this embodiment of the invention the shell member 1 is advanced into the air at plane speed during flying of the plane, and the impact of air against the open forward end causes the development of a dynamic pressure in the chamber forward of the partition 8 which is transmitted to the trap portion of the shell 1 over the partition 7 and thence through the tube 13 to the instrument 14. Simultaneously, the slots 16 permit a pressure to be established within the main portion of the shell 1 which pressure corresponds to the actual air pressure of the flight altitude of the plane at the time. This pressure is conveyed through the tube 17 to the static pressure chamber of the indicating instrument, and the pressure differential provided between the tubes 13 and 17 is perceived by the pressure sensitive member and indicated in terms of the speed of the plane, or other effects obtained as desired.

During take off from the water or during flying in rain, snow or sleeting conditions the spray or atmospheric water may tend to enter the opening 11, and in the absence of preventative means, to enter the forward end of the tube 5 and to be carried along to the trap portion of the shell. The speed of the plane causes any water which enters the opening 11 to pass inwardly in approximately a straight horizontal line with respect to the shell member 1 and accordingly the greater portion of any water entering the opening 11 strikes the baffle 10 and is thereby captured and coalesced with other particles of water to form substantial sized drops which under the influence of gravitation move downward to the lower edge of the baffle 10 and drip off, falling to the bottom of the chamber forward of the partition 8 and from thence the water is drained outward through the opening 12. The baffle 10 precipitates nearly all of the water driven into the opening 11 but any spray which escapes the baffle 10 tends to pass rearwardly through the dynamic pressure duct or Pitot tube 5 to the chamber above the partition 7. There, however, the absence of an air flow in the trap chamber permits the water to settle out upon the partition 7. This settled-out water drains away either forward through the tube 5 or backward through the outlet 15.

Flying through spray or rain merely tends to cause water to pass into the Pitot tube. However, flying through snow may cause the depositing of considerable amounts of snow within the tube which may be sufficient to close the end of the tube. This closure by ice or snow is prevented by the heater 6 which liberates sufficient heat adjacent the tube and the forward end of the duct to melt any snow which may be blown into the end of the tube. The melted snow also may drain outwardly through the opening 12, and any which may enter the tube 5 also is melted therein and may flow forward along the tube 5 or it may be carried backward into the trap portion and settle out on the partition 7. From this position it may still drain forward through the tube 5, or it may drain backward through the outlet 15.

Thus the Pitot tube as well as the static shell are kept free from water, ice and snow and are drained from spray or rain or snow water. Similarly, during sleeting conditions when ice may tend to form in or upon the tube 5 or the shell 1, the heater 6 maintains a sufficiently high temperature to prevent formation of ice from such causes as the presence of super-cooled atmospheric moisture.

The above described embodiment of the device of the invention is particularly adapted to mounting upon the upper surface of an airplane structure such as the upper surface of a wing or the upper surface of the fuselage, and when so mounted it has the outstanding value that it may be situated in a location higher than the level of the indicating instrument without danger of the connecting lines becoming water-locked, and without danger of the flow of water to the indicating instrument.

When so mounted, the device has the further advantage that it is above the greater portion of the spray thrown by the air blast when a plane is taking off from the surface of the water; and the further advantage that any spray which does enter the Pitot tube is caught and drained out of the lines before there is any chance for it to flow down to the indicating member.

Alternatively, the embodiment of Figs. 5 and 6 may be utilized. This embodiment is particularly adapted to mounting upon the forward edge of an airplane structure such as the forward edge of a wing or the forward end of the fuselage or upon a strut or other portion of the plane.

As shown in Figs. 5 and 6 this alternative embodiment consists of a shell portion 21 which is streamlined as shown, and attached to a supporting socket member 22 which, as before, may be mounted upon a supporting tube or upon a member 23 and form a horizontal extension of the horizontal shell portion. A dynamic tube 25 is mounted within the shell 21 and a heater 26 is provided adjacent the tube 25. A protuberant portion of the shell 21 is separated by a partition 27 to form a trap portion and a tube member 33 is provided entering the trap portion through the partition 27 and extending to a point near the top of the trap chamber. The tube 33 is continued through appropriate tube lines to the indicating instrument 34. A suitable drain opening 35 at the rear of the trap opening is provided as shown. Static pressure slots 36 are also provided and the static pressure line 37 is connected to the static pressure space of the shell 21 by way of a settling pocket 38. The tube 37 is similarly extended to the indicating instrument 34.

A partition 28 similar to the partition 8 of the first embodiment is provided to which there is attached a similar boss 29 and a similar baffle plate 30 facing the front opening 31. A similar drain opening 32 is likewise provided. A further drainport 39 may be provided in the static portion or chamber of the shell.

This embodiment operates in a manner closely similar to the previously described embodiment and the minor differences in operation will be apparent upon inspection of the drawings.

The streamlining of the shell 1 includes a streamlining of the trap portion and thereby permits a segregation of the trap space without interference either with the forward progress of the plane or with the accuracy of reading of the indicator, since no troublesome eddies or other disturbances are produced.

Either of the above described embodiments may, if desired, be mounted upon the end of a tubular strut in a manner closely similar to that of the previous types of Pitot tubes. Either embodiment is, however, particularly adapted to, and preferably mounted upon, a short socket directly attached to a convenient member of the airplane structure; and when so mounted the stresses imposed upon the shell by vibration or other movements given to the Pitot tube produce minimum amounts of stress because of the lower leverage incident to the shorter supporting member and the shorter radius of gyration.

The invention thus comprises a streamlined shell having therein a dynamic pressure tube, static pressure slots, a baffle and chamber at the forward end, water traps and drains for both thereof, and a heater for preventing the formation of ice or obstructions in the tube structure, such that the connected indicator is prevented from giving false indications because of obstructions of the Pitot-static members by ice.

While there are above disclosed but a limited number of embodiments of the device of the invention it is possible to provide still other embodiments thereof without departing from the inventive concept herein disclosed and it is therefore desired that only such limitations be imposed upon the appended claims as are stated therein.

What I claim and desire to protect by United States Letters Patent is:

1. A Pitot tube comprising a shell having a substantially horizontal tubular portion and a protuberance extending above said horizontal portion; a partition separating the space within the protuberance to form a chamber separate from the remainder of the space within said shell; a dynamic pressure duct in said horizontal portion forming a dynamic pressure port at the front end of the horizontal portion and terminating in said chamber; and a pressure connection at said chamber at a point above said duct and below the highest point of said protuberance.

2. A Pitot-static tube comprising a shell having a substantially horizontal tubular portion and a protuberance extending above said horizontal portion, the horizontal portion being provided with a static pressure opening in the side wall thereof and forward of said protuberance; a partition separating the space within the protuberance to form a first chamber separate from the remainder of the space within said shell, said remainder constituting a second chamber; a dynamic pressure duct in said horizontal portion forming a dynamic pressure port at the front end of the horizontal portion and terminating in said first chamber; and pressure ducts leading from the upper portions of said first and second chambers respectively.

3. A Pitot-static tube comprising a shell having a substantially horizontal tubular portion of substantially elliptical cross-section and a protuberance in the form of a shark's fin extending above said horizontal portion, the horizontal portion being provided with a dynamic pressure opening at the front end, and a static pressure opening in the side wall thereof and forward of said protuberance; a partition separating the space within the protuberance to form a first chamber separate from the remainder of the space within said shell, said remainder forming a second chamber; a dynamic pressure duct in said horizontal portion connecting said dynamic pressure opening and said first chamber; a socket member supporting said shell; and pressure ducts leading downward from the upper portions of said first and second chambers respectively and through said socket member.

4. A Pitot-static tube comprising a shell having a substantially horizontal tubular portion and a protuberance extending above said horizontal portion, the horizontal portion being provided with a static pressure opening in the side wall thereof and forward of said protuberance; a partition separating the space within the protuberance to form a first chamber separate from the remainder of the space within said shell, said remainder constituting a second chamber; a dynamic pressure duct in said horizontal portion forming a dynamic pressure port at the front end of the horizontal portion and terminating in said first chamber; a socket member supporting said shell and forming a substantially vertical downward extension thereof in line with said protuberance; and pressure ducts leading downward and outward of said shell from the upper portions of said first and second chambers respectively and through said socket member.

5. A Pitot-static tube comprising a shell having a substantially horizontal tubular portion and a protuberance extending above said horizontal portion, the horizontal portion being provided with a static pressure opening in the side wall thereof and forward of said protuberance; a partition separating the space within the protuberance to form a first chamber separate from the remainder of the space within said shell, said remainder constituting a second chamber; a dynamic pressure duct in said horizontal portion forming a dynamic pressure port at the front end of the horizontal portion and terminating in said first chamber; a socket member supporting said shell and forming a substantially horizontal extension thereof substantially in line with said horizontal portion; and pressure ducts leading downward and outward of said shell from the upper portions of said first and second chambers respectively and through said socket member.

6. A Pitot-tube comprising a shell having a substantially horizontal tubular portion and a protuberance extending above said horizontal portion; a partition separating the space within the protuberance to form a chamber separate from the remainder of the space within said shell, a drainport being provided connecting the lower portion of said chamber to the outside of said shell; a dynamic pressure duct in said horizontal portion forming a dynamic pressure port at the front end of the horizontal portion and terminating in said chamber; and a pressure duct leading outward of said shell from the inside of said chamber at a point above said drainport.

7. A Pitot-static tube comprising a shell having a substantially horizontal tubular portion and a protuberance extending above said horizontal portion, the horizontal portion being provided with a static pressure opening in the side wall thereof and forward of said protuberance; a partition separating the space within the protuberance to form a first chamber separate from the remainder of the space within said shell, said remainder constituting a second chamber, a first drainport being provided connecting the lower portion of said first chamber to the outside of said shell, and a second drainport being provided connecting the lower portion of said second chamber to the outside of said shell; a dynamic pressure duct in said horizontal portion forming a dynamic pressure port at the front end of the horizontal portion and terminating in said first chamber; and pressure ducts leading outward of said shell from points in said first and second chambers respectively above the respective drainports.

8. A Pitot-static tube comprising a T-shaped shell having a horizontal portion forming one arm of the T and having a dynamic pressure port at the front end, a closed protuberance extending substantially vertically above said horizontal portion and forming the second arm of the T, and a supporting extension forming the third arm of the T substantially aligned with one of the other arms; a partition separating the space within the protuberance to form a chamber separate from the remainder of the space within said shell; a dynamic pressure duct in said horizontal portion connecting said port and said chamber; and a pressure duct leading downward from said chamber and outward of said shell through said supporting extension.

PAUL KOLLSMAN.